Patented June 17, 1941

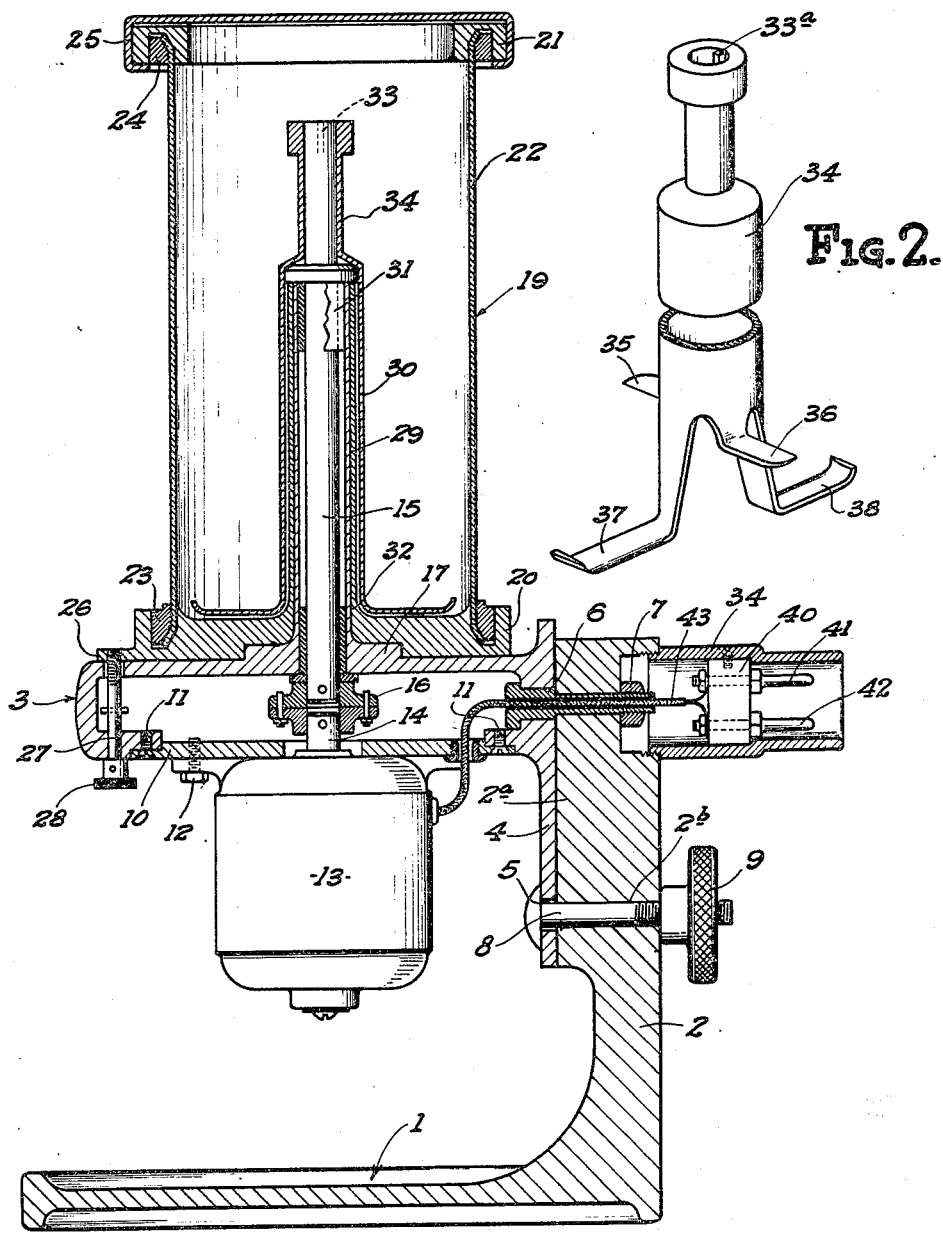

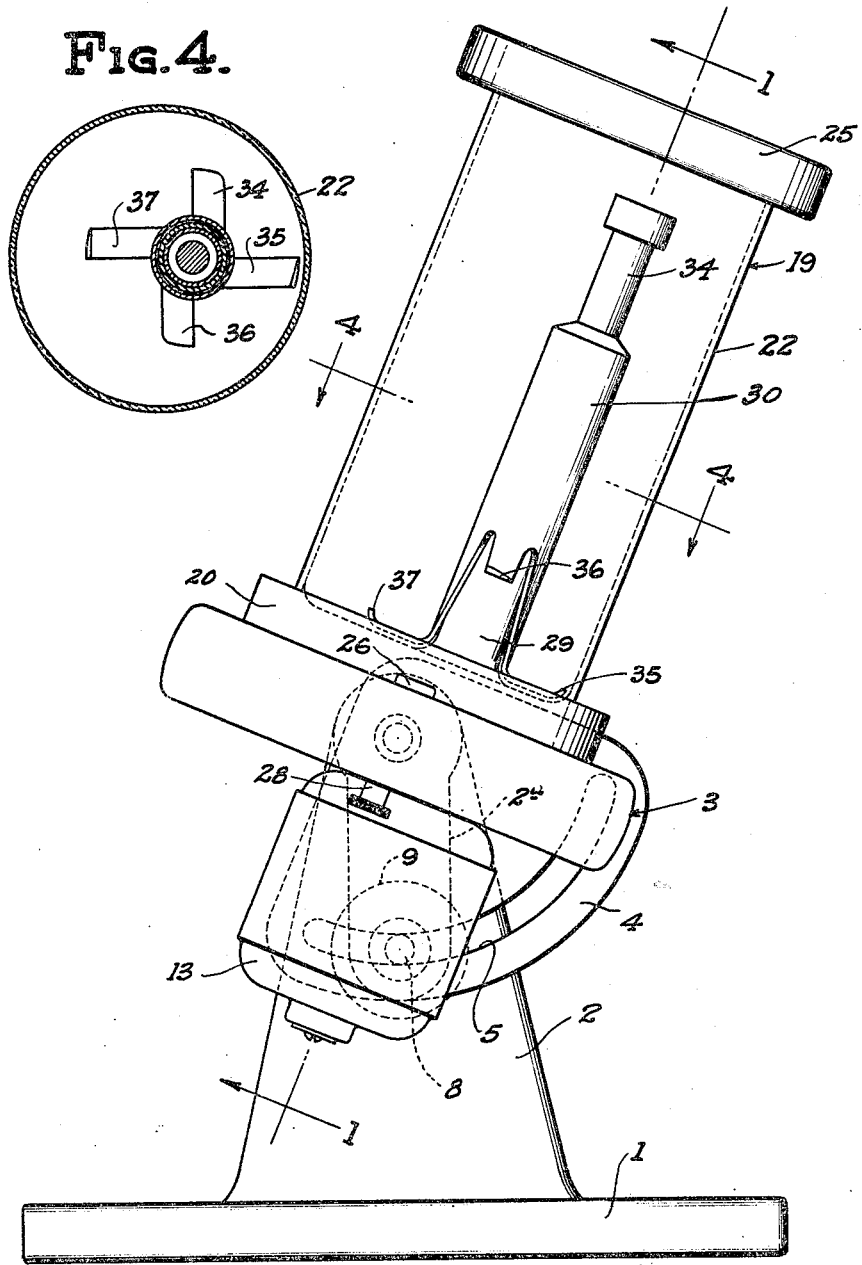

2,246,054

UNITED STATES PATENT OFFICE 2,246,054

FOOD CUTTER

John M. Marty, Parma, Ohio

Application February 21, 1939, Serial No. 257,679

11 Claims. (Cl. 146—124)

This invention relates to an apparatus for cutting and disintegrating food products such as fruits, leafy vegetables or more solid food products, such as meats and rooty vegetables.

One of the objects of the invention is to provide a machine of the character described which will effectively cut or disintegrate food products and obviate the objections to the present methods of grating, cutting, shredding or grinding foods.

In order to obtain the maximum food value from foods, it is desirable that the foods be disintegrated without the application of heat which destroys some of the food value such as the mineral salts or other constituents of the food. My device is designed and intended to obtain this result.

Another object of the invention is to provide an apparatus of the character described which is provided with a plurality of cutter blades so disposed, arranged and shaped that the contents of the vessel are circulated rapidly and in such a manner as to be brought into repeated contact with the cutting blades.

A further object of the invention is to provide an apparatus of the character described which includes a base member which supports a power unit such as an electric motor and which has detachably mounted thereon a vessel for receiving the food, the vessel being detachably secured to the base member and adjustable to different angular positions thereon, the vessel being also provided with means for receiving a shaft therein which is eccentially disposed with respect to the vertical axis thereof and having a cutter head detachably secured thereto.

A further object of the invention is to provide an apparatus of the character described having the distinguishing and characteristic features hereinbefore referred to and which is provided with a cutter head having thereon a plurality of blades disposed in different planes and so shaped and arranged as to obtain the maximum efficiency. Due to the particular arrangement and design of the several parts, my apparatus will function to cut food into very fine particles and preserve all of the desirable elements of the foods without the necessity for straining or other separation in order to make the foods edible and palatable. Such foods as leafy or rooty vegetables may be disintegrated in this machine in such manner as to break down the cell structure without the use of any foreign substance such as water or other liquid. Such foods as spinach, cabbage, celery and other leafy vegetables which contain a large percentage of water may be placed in the machine without the addition of water or other liquid to support the same and be thoroughly disintegrated, the result being a viscous liquid or flowable mass. Fatty or lean meats may also be disintegrated with this machine but it is necessary to cut such materials into reasonably small pieces and to add a limited amount of water to support the heavier pieces at the beginning of the cutting operation. One of the features of my invention resides in the particular cutter head having the cutting blades arranged as described and being so shaped that the particles of food are rapidly circulated about the vessel and brought into repeated contact with the cutting blades.

Another feature of the invention resides in the fact that the cutter head is eccentrically positioned within and readily removable from the vessel and that the vessel is also readily removable from its supporting base. The apparatus is designed primarily for domestic use but of course is useful in preparing any mixture where it is desired to obtain minute particles. The cutter head is driven by an electric motor which operates at a speed of between 10,000 and 15,000 revolutions per minute.

A still further object of the invention is to provide an apparatus having the above described distinctive and characteristic features and which consists of comparatively few parts which are well adapted for production at relatively low cost.

Further and more limited objects of the invention will appear as the description proceeds and by reference to the accompanying drawings in which Fig. 1 is a vertical sectional view of my improved apparatus on the line 1—1 of Fig. 3; Fig. 2 is a perspective view of the cutter head; Fig. 3 is a view in elevation with the vessel tipped in the position which it will occupy in normal operation; and Fig. 4 is a horizontal sectional view on the line 4—4 of Fig. 3.

Referring now to the drawings, the reference character 1 designates a supporting base which is preferably formed of a single casting and has an upstanding portion 2 having an enlarged head portion 2ª having an opening 2ᵇ therein. Pivotally mounted on the upstanding portion 2 is a vessel supporting member 3 which is generally circular in shape and preferably formed of a single casting which has a downwardly extending segmental portion 4 which has an arcuate slot 5 therein. The member 3 is pivotally mounted on the post 2 by means of a pivot pin 6 which is secured in place by a nut 7. Extending through the arcuate slot 5 and the opening 2ᵇ is a bolt 8 which threadedly receives over the outer end thereof a clamping nut 9. Secured to the bottom of the supporting member 3 is a plate 10 which is held in place by screws 11. Secured to the plate 10 by means of bolts 12 is an electric motor 13 from which extends a shaft 14 which connects with a shaft 15 by means of a suitable coupling 16. Formed integral with the supporting member 3 is a circular upstanding portion 17 which serves to position the vessel on the base member 3. The reference character 19 designates a vessel which consists of a base member 20 and a head member 21 which receive therebetween a circular transparent member 22 which is preferably formed of leucite. This material is capable of being bent or formed at slightly elevated temperatures and the lower end of the transparent member 22 is flanged outwardly and fits within a groove provided in the base member 20 and is held in place by a collar 23 which is forced into the groove. The opposite end of the transparent member is also flanged and fits within a groove provided in the member 21 and is held in place by a collar 24 which is forced into the groove. The upper end of the vessel is closed by a cover 25 which has a bayonet joint connection with the head member 21 so that it may be readily secured in place or removed. The base member 20 has formed thereon a flanged portion 26 having a threaded opening therein which receives a bolt 27 which extends through openings provided in the member 3. The opposite end of the bolt is provided with a knurled head or nut 28 by means of which the bolt may be turned to detachably secure the vessel in place. The member 20 has an upstanding hollow portion 29 which is formed integral therewith. Fitting within this portion is a sleeve 30 which is integral with the member 3 and extends to a point above the normal level of liquid in the vessel. The shaft 15 extends through the sleeve 30 and is provided with upper and lower bearings 31 and 32. The upper end of the shaft extends to a point adjacent the top of the vessel and is provided with a keyway 33. Fitting over the upper end of the shaft and loosely mounted thereon is a cutter head 34 shown in detail in Fig. 2 and which has a key 33ª formed integral therewith which engages in the keyway 33 to non-rotatably secure the cutter head to the shaft. The cutter head is preferably formed of a single piece of steel and is provided with an upper pair of blades 35 and 36 and a lower pair of blades 37 and 38. These blades are formed by cutting out portions of the metal of the cutter head and bending the same upwardly, as illustrated in Fig. 2. The lower pair of blades are disposed immediately adjacent the bottom end of the vessel and have their outer ends turned upwardly. The upper pair of blades are shorter than the lower pair of blades and preferably have their cutting edges disposed in a horizontal plane substantially parallel with the bottom of the vessel. The shaft 15 and cutter head 34 are eccentrically disposed with respect to the vertical axis of the circular vessel 19.

The cutter head is driven by the motor at a very high rate of speed of between 10,000 and 15,000 revolutions per minute. Due to the speed at which the cutter head is rotated, a vortex is caused to form in the liquid contents of the vessel. This vortex extends a considerable distance downwardly into the vessel and the upper pair of blades are preferably disposed in a plane adjacent the bottom of this vortex. The lower pair of blades have their outer ends upturned and are disposed in close proximity to the bottom of the vessel and prevent any undue accumulation of material at the low point of the vessel when it is tipped. Due to the particular arrangement and shape of the blades and due to the fact that the shaft and cutter head are eccentrically disposed with respect to the vertical axis of the vessel, and also due to the fact that the vessel is tipped in normal operation, the contents of the vessel are caused to circulate rapidly about the vessel in an unusual manner and to be brought into repeated contact with the cutter blades with the result that the contents are cut into very minute particles and the food products are reduced to a liquid mass in a very short period of time.

The vessel 19 is detachably secured to the base member 3 by means of the screw 28 and is positioned by the circular upstanding portion 17. When it is desired to remove the vessel the screw 28 is turned to release the base member 20 and the vessel merely lifted. Threadedly secured in the wall of the upstanding portion 2 is a fitting 39 which receives therein a jack 40 having terminals 41 and 42 adapted to receive the plug of an electrical connection. The terminals 41 and 42 are connected with the motor by means of wires 43 which lead through the tubular member 6. The vessel may be tipped to any desired angle by loosening the clamping nut 9 and turning the arcuate portion 4 about the pivot 6. For larger units, the vessel may be tipped about the pivot pin 6 to such an angle to permit the vessel to be emptied without removing it from the base. It will be noted that the base member 3 has a sleeve or integrally formed hollow upstanding central portion which extends upwardly therefrom to a point above the normal level of liquid in the vessel and that the bottom member 20 of the vessel has a hollow upstanding portion 29 which fits over the sleeve 30. It will thus be seen that any lubricant or other foreign matter which may escape from the bearings will not come in contact with the food in the vessel and contaminate the same.

It will now be clear that I have provided an apparatus for cutting and disintegrating food products which will accomplish the objects of the invention hereinbefore stated. It is of course to be understood that various changes may be made in the details of construction and arrangement of parts without departing from the spirit of my invention and that the embodiment of the invention herein disclosed is to be considered merely as illustrative and not in a limiting sense as the invention is limited only in accordance with the scope of the appended claims.

Having thus described my invention, what I claim is:

1. An apparatus for cutting or disintegrating food products comprising a base member, a vessel secured to said base member, a shaft extending into said vessel to a point adjacent the top thereof and disposed eccentrically thereto, a cutting head operatively connected with said shaft and rotatable therewith and having an upper pair of blades and a lower pair of blades, said lower pair of blades being disposed immediately adjacent the bottom of said vessel and having the outer ends thereof upturned, the outer ends of said lower pair of blades being disposed so as to extend to a point immediately adjacent the junction of the bottom and side walls of said vessel at one side thereof, said upper pair of blades being shorter than the lower pair of blades, said vessel being generally cylindrical in shape and being disposed at an angle to the horizontal.

2. In an apparatus of the character described, a base member, a generally cylindrical vessel detachably secured to said base member, a shaft extending into said vessel and disposed eccentrically thereto, a cutter head operatively connected with said shaft and having an upper pair of blades and a lower pair of blades, the upper end of said shaft being disposed above the normal level of material in said vessel and said cutter head fitting loosely over the upper end of said shaft and readily removable therefrom, and said blades being pitched so as to urge said head downwardly in operation.

3. In an apparatus of the character described, a base member, a generally cylindrical vessel detachably secured to said base member, a shaft extending into said vessel and disposed eccentrically thereto, a cutter head operatively connected with said shaft and having an upper pair of blades and a lower pair of blades, said lower pair of blades being disposed immediately adjacent the bottom of said vessel and said upper pair of blades being spaced a substantial distance above the bottom of the vessel and said lower pair of blades having the end portions thereof disposed so as to closely approach the junction of the bottom and side walls of the vessel at one side thereof, and means for rotating said shaft.

4. In an apparatus of the character described, a base member, a generally cylindrical vessel detachably secured to said base member, a shaft extending into said vessel and disposed eccentrically thereto, a cutter head operatively connected with said shaft and having an upper pair of blades and a lower pair of blades, said lower pair of blades being disposed immediately adjacent the bottom of said vessel and having the outer ends thereof upturned and said upper pair of blades being shorter than the lower pair of blades and disposed considerably above and in a plane substantially parallel with the bottom of said vessel, said lower pair of blades having the ends thereof disposed so as to closely approach the junction of the bottom and side walls of the vessel at one side thereof when rotated.

5. In an apparatus for cutting or disintegrating food products comprising a base member, a vessel detachably secured to said base member and adjustable thereon to different angular positions, a shaft extending into said vessel and disposed eccentrically thereto, a cutter head operatively connected to said shaft and having thereon an upper pair of blades and a lower pair of blades, the lower pair of blades being disposed immediately adjacent the bottom of said vessel and said upper pair of blades being shorter than said lower pair of blades and being disposed in a substantially horizontal plane and spaced a considerable distance above said lower pair of blades, said lower pair of blades having the ends thereof disposed so as to closely approach the junction of the bottom and side walls of the vessel at one side thereof, and means for rotating said shaft.

6. An apparatus of the character described comprising a base member, a vessel detachably secured to said base member, a shaft extending into said vessel eccentric to the vertical axis thereof, a cutter head detachably secured over said shaft and having portions thereof cut out and bent outwardly therefrom to provide an upper pair of cutting blades and a lower pair of cutting blades, said lower pair of blades being disposed immediately adjacent the bottom of the vessel and having the ends thereof disposed so as to closely approach the junction of the bottom and side walls of the vessel at one side thereof when rotated.

7. An apparatus of the character described comprising a base member, a generally cylindrical vessel detachably secured to said base member, a shaft extending into said vessel eccentric to the vertical axis thereof, a cutter head fitting over said shaft and having an upper pair of radially disposed cutting blades and a lower pair of radially disposed cutting blades, said lower pair of cutting blades being disposed immediately adjacent the bottom of said vessel and serving to prevent the accumulation of food particles at the bottom of said vessel and having the ends thereof turned upwardly, said upper pair of cutting blades having a different pitch from said lower pair of blades and being spaced a substantial distance above said lower pair of blades, the outer ends of said lower pair of blades traveling in a path disposed immediately adjacent the junction of the side and bottom walls of the vessel at one side thereof.

8. An apparatus of the character described comprising a base member, a vessel pivotally mounted on said base member and movable to different angular positions thereon, a shaft eccentrically positioned within said vessel, a cutter head operatively connected with said shaft and having an upper pair of cutting blades and a lower pair of cutting blades, a motor for driving said shaft and means for adjusting the angular position of said vessel with respect to said base member to permit the contents of the vessel to be poured therefrom.

9. An apparatus of the character described comprising a base member, a vessel generally cylindrical in shape and detachably secured to said base member, a shaft disposed within said vessel eccentric to the vertical axis thereof, a cutting head detachably fitting over said shaft and operatively connected therewith, a lower pair of radially disposed cutting blades carried by said cutting head and disposed immediately adjacent the bottom of said vessel, said blades being of such length that the ends thereof extend to a point immediately adjacent the junction of the bottom and side walls of the vessel at one side thereof, an upper pair of radially disposed cutting blades carried by said cutting head and disposed at an angle to said lower pair of blades and having a different pitch than said lower blades, said upper blades extending in a substantially horizontal plane, and a motor operatively connected with said shaft.

10. An apparatus of the character described comprising a base member, a vessel generally cylindrical in shape and detachably secured to said base member, a shaft disposed within said vessel eccentric to the vertical axis thereof, a cutting head detachably fitting over said shaft and operatively connected therewith, a lower pair of radially disposed cutting blades carried by said cutting head and disposed immediately adjacent the bottom of said vessel, said blades being of such length that the ends thereof extend to a point immediately adjacent the junction of the bottom and side walls of the vessel at one side thereof, an upper pair of radially disposed cutting blades carried by said cutting head and disposed at an angle to said lower pair of blades and having a different pitch than said lower blades, said upper blades extending in a substantially horizontal plane, a motor operatively connected with said shaft, and means for tipping said vessel about a horizontal axis.

11. An apparatus of the character described comprising a base member, a vessel generally cylindrical in shape and detachably secured to said base member, a shaft disposed within said vessel eccentric to the vertical axis thereof, a cutting head detachably fitting over said shaft and operatively connected therewith, a lower pair of radially disposed cutting blades carried by said cutting head and disposed immediately adjacent the bottom of said vessel, said blades being of such length that the ends thereof extend to a point immediately adjacent the junction of the bottom and side walls of the vessel at one side thereof, an upper pair of radially disposed cutting blades carried by said cutting head and disposed at an angle to said lower pair of blades and having a different pitch than said lower blades, said upper blades extending in a substantially horizontal plane, and a motor operatively connected with said shaft, said cutting head fitting loosely over said shaft and said blades having such a pitch as to tend to move said cutting head downwardly upon rotation thereof.

JOHN M. MARTY.